May 15, 1956
C. G. MARTIN ET AL
MEANS AND METHOD OF SEATING BRUSHES
ON ROTATING ELECTRICAL MACHINES
Filed Sept. 17, 1952
2,745,976
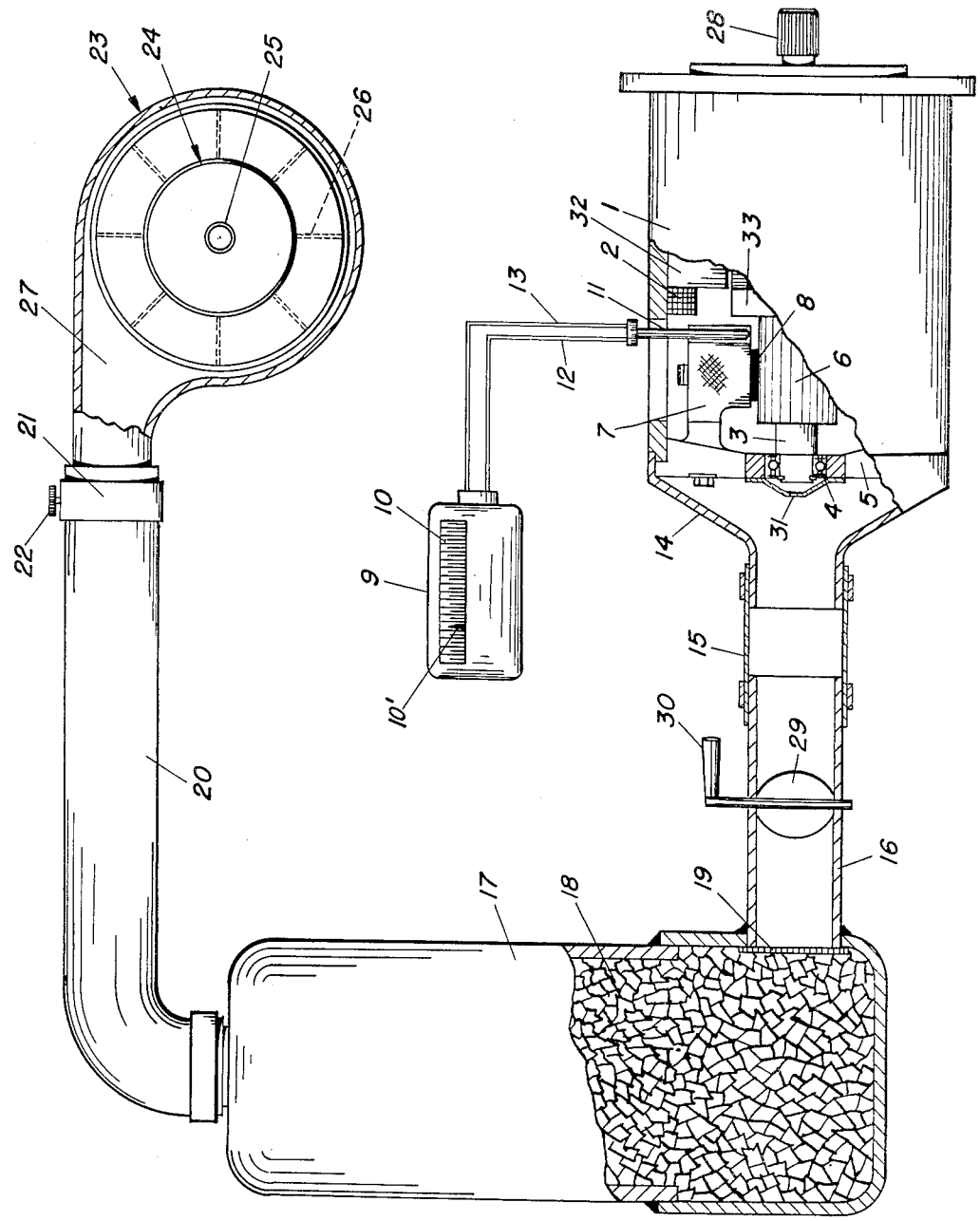
INVENTORS
CECIL G. MARTIN
BY JAMES H. JOHNSTON
Frank N Harmon
ATTORNEY

United States Patent Office 2,745,976
Patented May 15, 1956

2,745,976

MEANS AND METHOD OF SEATING BRUSHES ON ROTATING ELECTRICAL MACHINES

Cecil G. Martin, Parkview, and James H. Johnston, Bedford, Ohio, assignors to Jack & Heintz, Inc., Cleveland, Ohio, a corporation of Delaware Application September 17, 1952, Serial No. 309,998

5 Claims. (Cl. 310—228)

This invention relates to improvements in method and means for seating brushes for rotating electrical machines.

In rotating electrical machines, such as alternators or generators, or the like, the conventional practice for seating slip ring, or commutator brushes, has been to sand the brushes to the approximate slip ring, or commutator contour, and then run the electrical machine at less than operating speed until the brushes become fully seated for proper subsequent operation of the machine in actual use. This procedure has been found to be time consuming to an expensive and objectionable degree. In aircraft rotating electrical equipment, such as generators, alternators, and the like, it is a common occurrence for such practice to consume as much as twenty-four hours for one set of brushes.

One of the primary objects of the invention is to provide a new and novel means and method of seating brushes to the slip ring, or commutator contour of such rotating electrical machines, that will be simple, inexpensive, more efficient and which will involve a time element that is virtually negligible, in comparison with conventional methods now employed.

It has been well established in the art that high brush operating temperatures and lack of atmospheric moisture prevailing at high altitudes result in undesired excessive brush wear in aircraft rotating electrical machines.

Having this phenomenon well in mind and knowing that it is normally undesirable, it is a more specific object of our invention to utilize it in a new and useful manner.

It is therefore a more specific object of our invention to load the rotating electrical machine and use positive means for reducing the quantity of cooling air, as well as the moisture content thereof, until predetermined brush temperatures are reached, so that the brushes, at high and dry air temperatures, may be properly seated in the minimum time elapse.

The conventional approach to a solution of this recognized brush seating problem has been to subject the brushes to various compounds in order to inhibit rapid brush wear, or dusting. In direct contrast, we propose to provide a new and novel means and method for brush seating, whereby we are able to duplicate actual running dusting conditions, in order to insure brush seating within an extremely shortened time interval.

With the foregoing and other objects in view, the invention resides in the combination of parts and the details of construction and process, hereinafter set forth in the following specification and appended claims, certain embodiments thereof being illustrated in the accompanying drawing, which is a schematic layout of our improved brush seating system, and showing a generator, in side elevation, partly broken away to show a commutator and brush, an indicator for brush temperature, an air blower, an atmospheric moisture collecting vessel and a conduit with a butterfly valve control for dry air under pressure to the brushes, slip rings, or the like.

Referring more particularly to the drawings, we have shown, for purposes of illustration, a conventional generator, having a casing 1, stator 32, interpoles 2, armature 33, commutator 5, input spline drive 28, and a shaft 3 mounted in bearings 4 of an end wall 5, the bearing being provided with a seal 31. The end wall 5 is also shown as a means for supporting the usual commutator brush holder 7 and brushes 8.

As stated before, the conventional practice has been to sand the brushes to the approximate slip ring, or commutator contour, and to then run the machine until the brushes become fully seated.

In contrast, we herein provide means for quickly causing dusting of the brushes. Having discovered that atmospheric moisture materials inhibit brush seating, we propose to introduce air, only after the moisture has been removed, to the brushes, so that as the machine is run, the brushes will dust and properly seat within a short period of time.

In order to accomplish this, we provide for a positively induced flow of pressure air through a medium for removing moisture, and then to the air scoop 14 of the machine to be played over the brushes while the machine is running. Such an air drying medium may be a vessel 17 containing a suitable moisture absorbing material 18, such as activated alumina, or the like. The outlet opening of vessel 17 may be provided with a screen 19 and an outlet tube 16 connected, through a flexible coupling 15, to the inlet scoop 14. To the air inlet to the vessel 17, we may attach a conduit 20, and to this conduit 20, we secure by such means as a collar 21 and set screw 22, an air blower assembly, generally indicated at 23. This air blower may include a blower fan 24 mounted to rotate with a driving shaft 25 and provided with peripheral blades 26 to blow air through the progressively decreasing throat 27.

For purposes of indicating the running temperature of the brushes during their seating operation, we may provide an indicator 9, graduated at 10 with a movable pointer 10' to register with the graduations 10. A suitable temperature responsive element 11 extends into one or more of the brushes and is connected through leads 12 and 13 to any suitable mechanism to move the pointer 10' to indicate the brush operating temperature.

In the conventional practice of brush seating operation, the long time consuming procedure is to run the machine at slow speed, with no air moisture removal, or air blast control, and at a running brush temperature of about 250° F. This entails an operation as much as twenty-four hourse before brush seating occurs. During this operation there are also the hazards of arcing, due to moisture being present, and of insulation wear and varnish failure.

In our process, which includes blower pressure air that is virtually devoid of moisture, we run the machine at full speed and permit brush temperature to reach the actual running temperature, as high as 450° to 500° F., and for a relatively short period of time of as little as two hours, or less. We have found under our controlled conditions, this short time interval to be sufficient for proper brush seating. In order to control temperature conditions, it is only necessary to provide such a control as a butterfly valve 29 in conduit 16, manually operable by a handle 30, to control the air blast from the blower to blow the dry air over the brushes.

It will thus be seen that we have provided a new and novel means and method for brush seating, which eliminates the use of brush sanding compounds, reduces the seating time interval, removes moisture from the brush seating environment and reduces brush wear and varnish breakdown and eliminates the hazard of arcing.

We claim:

1. In combination with a rotating electrical machine, a relatively rotatable current collector and a relatively stationary member, seating means for seating said stationary member in predetermined desired seating engagement with the outer contour of said collector during running operation of said machine, said seating means comprising an air inlet for said machine to said stationary member, means for delivering moisture-free pressure air through said inlet to said stationary member and means for controlling this flow of dry air to said stationary member during its self-seating operation while said machine is running.

2. In combination with a rotating electrical machine, a relatively rotatable current collector and a relatively stationary member, seating means for seating said stationary member in predetermined desired seating engagement with the outer contour of said collector during running operation of said machine, said seating means comprising an air inlet for said machine to said stationary member, means for delivering moisture-free pressure air through said inlet to said stationary member and means for controlling this flow of dry air and for temperature control for said stationary member during its self-seating operation while said machine is running.

3. In combination with a rotating electrical machine, a relatively rotatable current collector and a relatively stationary member, seating means for seating said stationary member in predetermined desired seating engagement with the outer contour of said collector during running operation of said machine, said seating means comprising an air inlet conduit for said machine to said stationary member, a moisture absorbent material containing member, an air blower for blowing air therethrough for delivering moisture-free pressure air through said conduit to be played upon said stationary member and means for controlling this flow of dry air and for temperature control for the stationary member during its self-seating operation while said machine is running.

4. In combination with a rotating electrical machine, a relatively rotatable current collector and a relatively stationary member, seating means for seating said stationary member in predetermined desired seating engagement with the outer contour of said collector during running operation of said machine, said seating means comprising an air inlet conduit for said machine to said stationary member, a moisture absorbent material containing member, an air blower for blowing air therethrough for delivering moisture-free pressure air through said conduit to be played upon said stationary member and means for controlling this flow of dry air and for temperature control for the stationary member during its self-seating operation while said machine is running.

5. In combination with a rotating electrical machine, a relatively rotatable current collector and a relatively stationary member, seating means for seating said stationary member in predetermined desired seating engagement with the outer contour of said collector during running operation of said machine at substantially full speed, said seating means comprising temperature indicating means for said stationary member, an air inlet conduit for said machine to said stationary member, a moisture absorbent material containing member, an air blower for blowing air therethrough for delivering moisture-free pressure air through said conduit to be played upon said stationary member and a manual valve control for controlling this flow of dry air and for temperature control for the stationary member during its self-seating operation while said machine is running.

References Cited in the file of this patent

UNITED STATES PATENTS

| | | |
|---|---|---|
| 860,791 | Ellis | July 23, 1907 |
| 1,121,014 | Hobart | Dec. 15, 1914 |
| 2,106,842 | Hague | Feb. 1, 1938 |